(12) United States Patent
Erker

(10) Patent No.: US 11,234,360 B2
(45) Date of Patent: Feb. 1, 2022

(54) DRIVE AND SENSING SYSTEM FOR AGRICULTURAL AGITATOR

(71) Applicant: CNH Industrial Canada, Ltd., Saskatoon (CA)

(72) Inventor: Gregory Jacob Erker, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 388 days.

(21) Appl. No.: 16/265,835

(22) Filed: Feb. 1, 2019

(65) Prior Publication Data
US 2020/0245536 A1 Aug. 6, 2020

(51) Int. Cl.
| | |
|---|---|
| *B22C 5/00* | (2006.01) |
| *A01C 15/00* | (2006.01) |
| *B01F 7/00* | (2006.01) |
| *B01F 15/00* | (2006.01) |
| *B01F 13/10* | (2006.01) |

(Continued)

(52) U.S. Cl.
CPC .......... *A01C 15/005* (2013.01); *A01C 15/007* (2013.01); *A01C 19/02* (2013.01); *B01F 7/00633* (2013.01); *B01F 13/1002* (2013.01); *B01F 15/00201* (2013.01); *A01C 7/04* (2013.01); *B01F 2215/0013* (2013.01)

(58) Field of Classification Search
CPC ................................................... A01C 15/007
See application file for complete search history.

(56) References Cited

U.S. PATENT DOCUMENTS

| | | | | |
|---|---|---|---|---|
| 3,940,680 A | * | 2/1976 | Tadokoro | .................. H02P 4/00 104/289 |
| 4,553,084 A | * | 11/1985 | Wrathall | ................ G01R 17/06 323/314 |

(Continued)

FOREIGN PATENT DOCUMENTS

| | | |
|---|---|---|
| DE | 102013018934 | 7/2014 |
| WO | 2004009899 | 1/2004 |

OTHER PUBLICATIONS

Kang, Wu; "Energy-efficient sensorless motor control, variable speed motor control", Control Engineering Magazines and Newsletters. 2011, pp. 1-5.

(Continued)

*Primary Examiner* — Anshu Bhatia
*Assistant Examiner* — Gregory Y Huan
(74) *Attorney, Agent, or Firm* — Rebecca L. Henkel; Rickard K. DeMille

(57) ABSTRACT

A particulate material sensing and agitation control system of an agricultural system includes an agitator configured to induce movement of particulate material through the agricultural system, a drive system coupled to the agitator, and a sensing system configured to determine a current flowing through the drive system. The drive system is configured to move the agitator, and the drive system is powered via an electrical circuit. The sensing system includes a first input coupled to a first point on the electrical circuit, the sensing system includes a second input coupled to a second point on the electrical circuit, the sensing system is configured to determine a voltage differential between the first point and the second point, and the sensing system is configured to determine current flowing through the electrical circuit based on the voltage differential.

14 Claims, 6 Drawing Sheets

(51) Int. Cl.
*A01C 19/02* (2006.01)
*A01C 7/04* (2006.01)

(56) References Cited

U.S. PATENT DOCUMENTS

| | | | |
|---|---|---|---|
| 5,600,218 A | 2/1997 | Holling et al. | |
| 5,838,127 A * | 11/1998 | Young | H02P 6/24 |
| | | | 318/293 |
| 6,639,502 B2 | 10/2003 | Herrick | |
| 7,042,180 B2 | 5/2006 | Terry et al. | |
| 7,183,734 B2 | 2/2007 | Lassen | |
| 7,504,784 B2 | 3/2009 | Asada et al. | |
| 7,812,557 B2 | 10/2010 | Maekawa | |
| 7,913,340 B2 | 3/2011 | Koo et al. | |
| 8,344,683 B2 | 1/2013 | Schulter et al. | |
| 8,424,347 B2 | 4/2013 | Maekawa et al. | |
| 8,476,853 B2 | 7/2013 | Vanko et al. | |
| 9,093,931 B2 | 7/2015 | Shibuya et al. | |
| 9,106,176 B2 | 8/2015 | Berringer et al. | |
| 9,214,885 B1 | 12/2015 | Glenn et al. | |
| 9,295,362 B2 | 3/2016 | Eriksson | |
| 9,431,933 B2 | 8/2016 | Takami et al. | |
| 9,708,745 B2 | 7/2017 | Jung et al. | |
| 9,725,951 B2 | 8/2017 | Slupik et al. | |
| 9,748,882 B1 | 8/2017 | Breheny et al. | |
| 9,765,468 B2 | 9/2017 | Kim et al. | |
| 9,787,229 B2 | 10/2017 | Weissbach et al. | |
| 9,806,654 B2 | 10/2017 | Jung et al. | |
| 2010/0167798 A1 * | 7/2010 | Kawai | H03F 1/34 |
| | | | 455/572 |
| 2014/0302228 A1 * | 10/2014 | Reineccius | A01C 1/06 |
| | | | 427/4 |
| 2018/0223467 A1 | 8/2018 | Hoshino | |
| 2018/0357883 A1 * | 12/2018 | Wienhold | H04Q 9/00 |

OTHER PUBLICATIONS

Diab, Ahmed A. Zaki; "Robust simultaneous estimation of stator and rotor resistances and rotor speed for predictive maintenance of sensorless induction motor drives", International Journal of Power and Energy Conversion. 2017 vol. 8 No. 4. pp. 1-2.

* cited by examiner

DRIVE AND SENSING SYSTEM FOR AGRICULTURAL AGITATOR

BACKGROUND

The present disclosure relates generally to a drive and sensing system for an agricultural agitator.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are towed behind a work vehicle, such as a tractor. These implements may contain a particulate material, such as seeds, fertilizer, and/or other agricultural product, which is distributed on or in the ground using various methods. Certain implementations include a storage tank in which the particulate material is stored and a metering system configured to meter the particulate material from the storage tank. The particulate material is distributed from the metering system to row units, which are configured to distribute the particulate material on or in the ground.

As the storage tank is filled with the particulate material and/or while the particulate material flows from the storage tank to the metering system, the particulate material may create an undesirable profile within the storage tank. Several factors may contribute to this undesirable profile, including, but not limited to, friction between the particulate material and the storage tank, clumping of the particulate material, operation of the implement on a slope, and an inactive portion or inactive portions of the metering system. This undesirable profile may lead to uneven flow to the metering system, which may cause an unwanted distribution or no distribution of the particulate material over and/or within certain regions of a field. As a result, the crop yield within these regions may be reduced, thereby reducing the efficiency of the seeding process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particulate material sensing and agitation control system of an agricultural system includes an agitator configured to induce movement of particulate material through the agricultural system, a drive system coupled to the agitator, and a sensing system configured to determine a current flowing through the drive system. The drive system is configured to move the agitator, and the drive system is powered via an electrical circuit. The sensing system includes a first input coupled to a first point on the electrical circuit, the sensing system includes a second input coupled to a second point on the electrical circuit, the sensing system is configured to determine a voltage differential between the first point and the second point, and the sensing system is configured to determine current flowing through the electrical circuit based on the voltage differential.

DRAWINGS

These and other features, aspects, and advantages of the present disclosure will become better understood when the following detailed description is read with reference to the accompanying drawings in which like characters represent like parts throughout the drawings, wherein.

Figure 3:
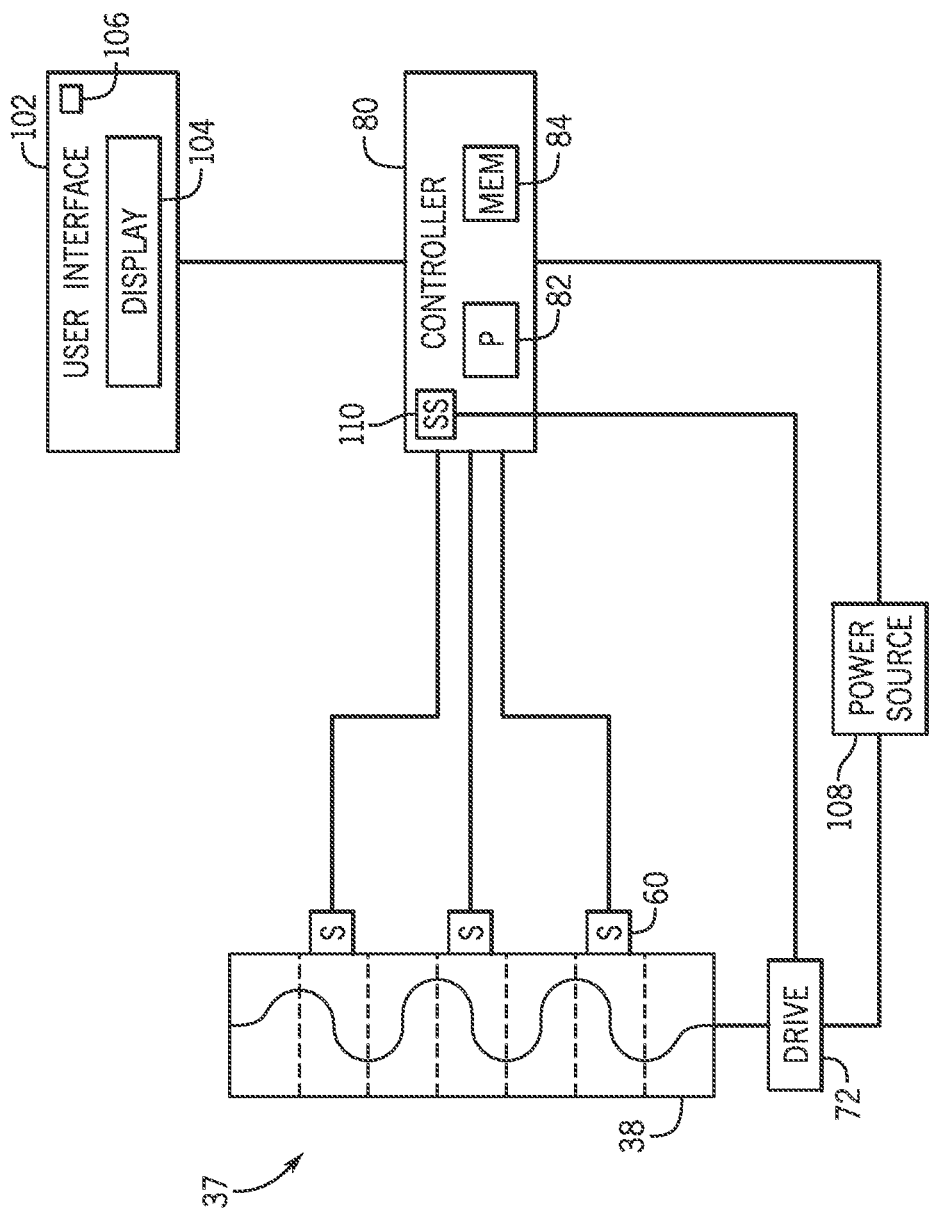
FIG. 3 is a schematic view of an embodiment of a particulate material sensing and agitation control system having a control system, in accordance with an aspect of the present disclosure.
Figure 5:
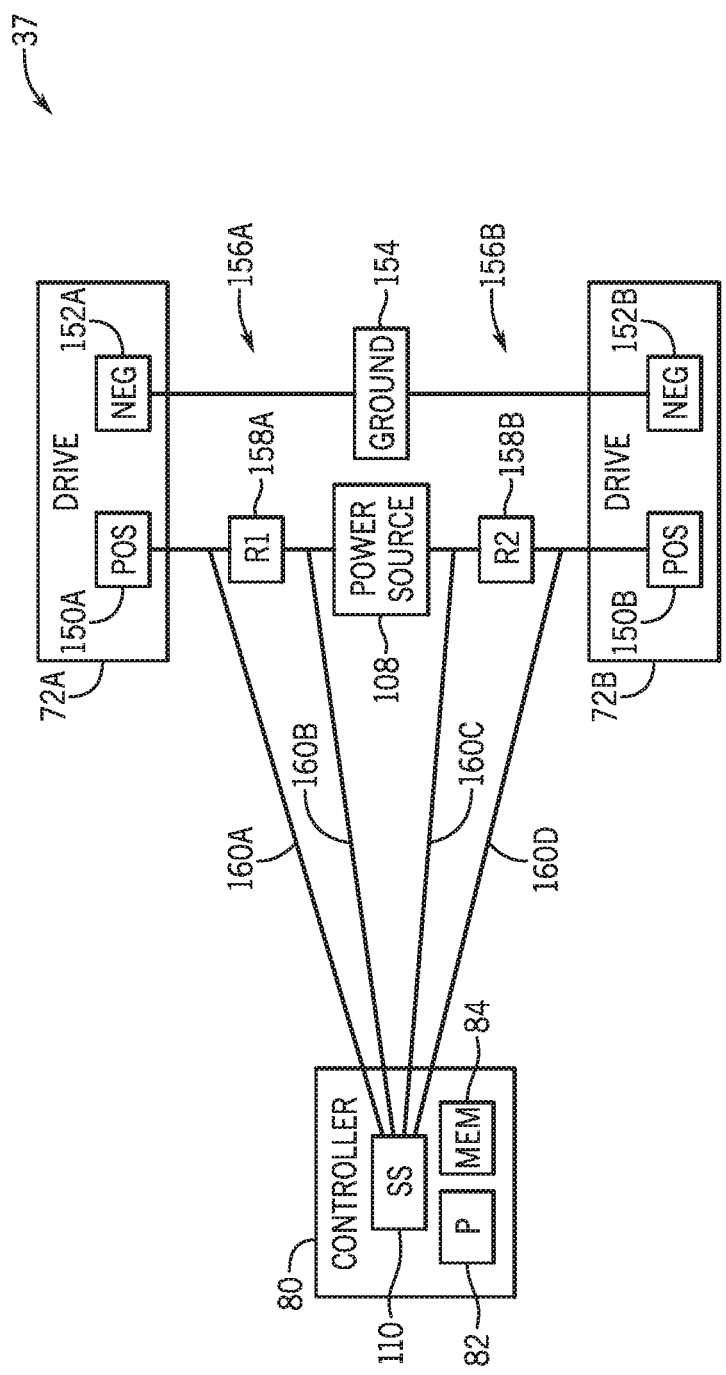
Figure 6:
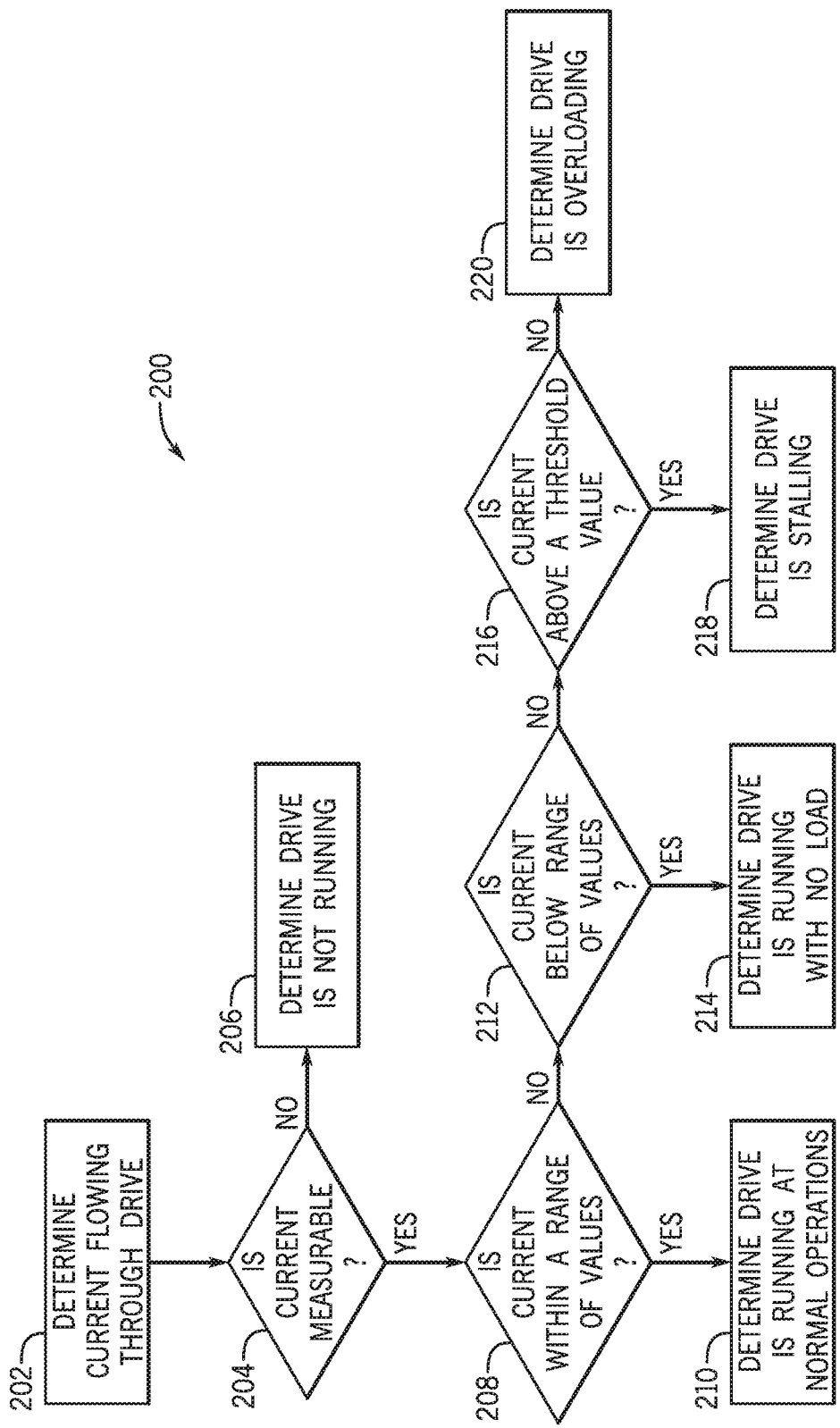

FIG. 5 is a schematic view of the particulate material sensing and agitation control system of FIG. 3 having the controller, in which a sensing system is configured to determine a current flowing through a positive section of a drive system, in accordance with an aspect of the present disclosure; and FIG. 6 is a flowchart of an embodiment of a method to determine a condition of a drive system based on a determined current flowing through the drive system, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to agricultural systems having a particulate material sensing and agitation control system. Certain agricultural systems (e.g., air carts, implements, etc.) contain a particulate material (e.g., seeds, fertilizer, and/or other agricultural products) within a storage tank of the agricultural system. The agricultural system is configured to distribute the particulate material throughout a field. The particulate material may flow from the storage tank through a metering system, which is configured to control the flow of the particulate material to the field. In certain circumstances, the profile of the particulate material within the storage tank may affect a manner in which the particulate material moves through the metering system. For example, the profile of the particulate material may cause a reduced amount of particulate material to flow through certain meters of the metering system.

As such, the agricultural system may include a particulate material sensing and agitation control system configured to monitor the profile of the particulate material and adjust the profile of the particulate material. As an example, the particulate material sensing and agitation control system may include one or more drive systems that are each configured to drive an agitator to induce movement of particulate material within the storage tank. For example, each drive system may be controlled by a controller of the particulate material sensing and agitation control system based on certain operating parameters of the agricultural system, such as a profile of particulate material in the storage tank, a flow rate of particulate material through the metering system, and the like. In certain agricultural systems, measuring a torque output of the drive system may determine such operating parameters and determine a suitable operation of the drive system. However, implementing a drive system that is configured to measure torque may be costly. For example, such drive systems may be costly and/or complex, or may not be readily available to be implemented.

Thus, in accordance with the present disclosure, a sensing system is communicatively coupled to the controller of the agricultural system to determine the current flowing through the drive system. The current flow varies based on torque, so determining the current may determine the torque applied by the drive system, and the controller may operate the drive system based on the determined current. For example, the sensing system may determine the current flow based on a voltage between certain points of the drive system. The sensing system may output a signal indicative of the current to the controller, without having to implement certain additional components, such as a torque sensor. Implementing the sensing system may reduce a cost, difficulty, and/or or complexity to manufacture the agricultural system as compared to utilizing a drive system with a torque sensor or an additional monitoring system.

Figure 1:
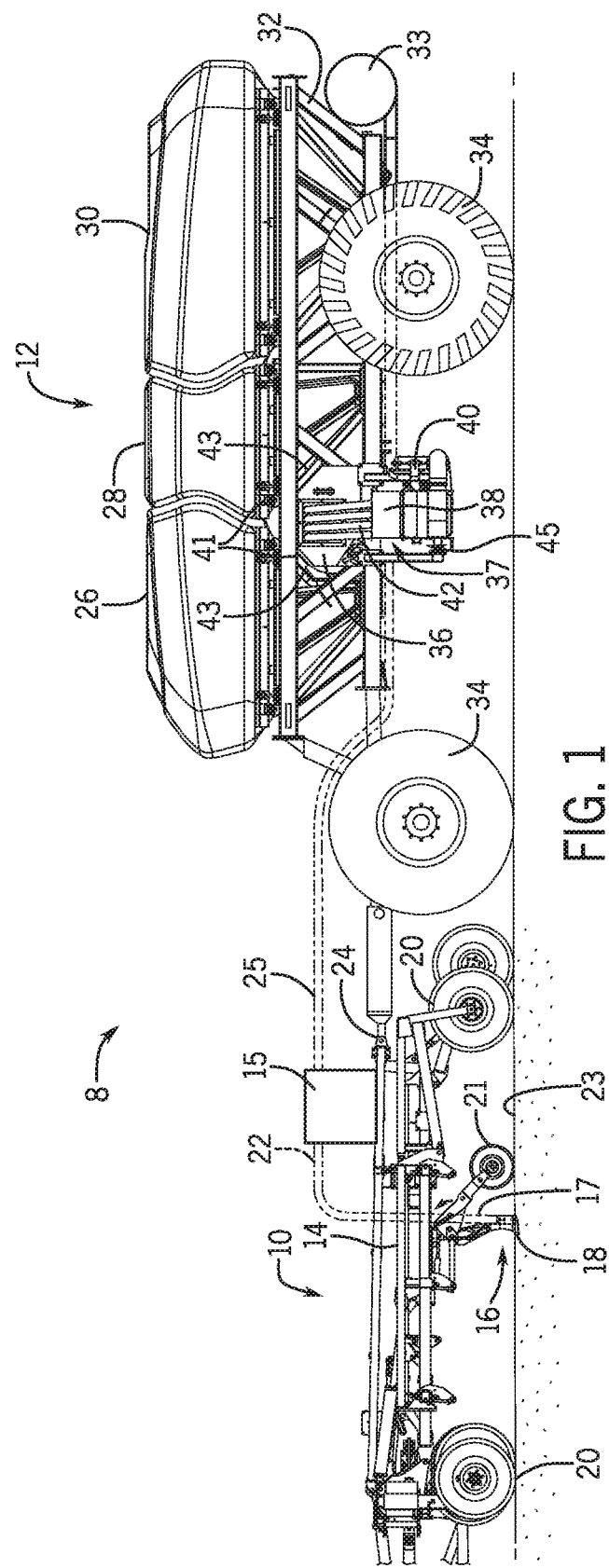
FIG. 1 is a side view of an embodiment of an agricultural system having an agricultural implement coupled to an air cart, in accordance with an aspect of the present disclosure.

With the foregoing in mind, the present embodiments relating to particulate material sensing and agitation control systems may be utilized within any suitable agricultural system. To help illustrate, FIG. 1 is a side view of an embodiment of an agricultural system 8 having an agricultural implement 10 coupled to an air cart 12. As depicted, the agricultural implement 10 includes a tool frame 14 coupled to a header 15, a row unit 16 having a particulate material tube 17 and an opener 18, and wheel assemblies 20. The agricultural implement 10 may be pulled by a work vehicle (e.g., a tractor) to deposit rows of particulate material (e.g., agricultural product) within the soil. Accordingly, the wheel assemblies 20 may contact the soil surface to enable the agricultural implement 10 to be pulled by the work vehicle. As the agricultural implement 10 is pulled, a row of the particulate material may be deposited in the soil by the row unit 16 (e.g., ground engaging opener assembly). Although only one row unit 16 is shown, the agricultural implement 10 may include multiple row units 16 (e.g., organized in a row across the agricultural implement 10). In some embodiments, the agricultural implement 10 may include a row of 12, 14, 16, 18, 20, or more row units 16, which may each deposit a respective row of particulate material into the soil.

To facilitate depositing the particulate material, each row unit 16 (e.g., ground engaging opener assembly) may include a press wheel 21. While the opener 18 engages the soil 23, the opener 18 exerts a force that excavates a trench into the soil 23 as the row unit 16 travels across the soil 23. The particulate material may be deposited into the excavated trench via the particulate material tube 17. Then, the press wheel 21 may pack soil onto the deposited particulate material. In certain embodiments, the press wheel may not directly be a part of the row unit. Instead, for example, at least one press wheel may be mounted to the frame of the implement behind the at least one row unit. Furthermore, while the illustrated row unit includes a ground engaging opener assembly, in alternative embodiments, at least one row unit on the implement may include an applicator assembly configured to deposit particulate material onto the surface of the field, or any other suitable type of product deposition assembly.

The header 15 may provide the particulate material to the row units 16. In some embodiments, the header 15 may pneumatically distribute the particulate material from a primary line to secondary lines. In the illustrated embodiment, a primary line 25 directs particulate material from the air cart 12 to the header 15. Additionally, the header 15 is configured to distribute the particulate material to the row units 16 via respective secondary lines 22. In certain embodiments, multiple primary lines may direct particulate material to multiple headers. Moreover, multiple secondary lines may extend from each header to respective row units. Furthermore, in certain embodiments, at least one secondary line may extend to a secondary header, and multiple tertiary lines may extend from the secondary header to respective row units.

In the depicted embodiment, the air cart 12 is towed behind the agricultural implement 10. For example, the agricultural implement 10 may be coupled to the work vehicle by a first hitch assembly, and the air cart 12 may be coupled to the agricultural implement 10 by a second hitch assembly 24. However, in other embodiments, the agricultural implement may be towed behind the air cart. In further embodiments, the agricultural implement and the air cart may be part of a single unit that is towed behind the work vehicle, or may be elements of a self-propelled vehicle.

The air cart 12 may centrally store particulate material and distribute the particulate material to the header 15. Accordingly, as depicted, the air cart 12 includes three primary storage tanks 26, 28, and 30, an air cart frame 32, an air source 33, and wheels 34. Further, the air cart 12 includes an auxiliary or secondary storage tank 36, a fill hopper 38, an air supply 40, and product conveyance conduits 42. The second hitch assembly 24 is coupled between the tool frame 14 and the air cart frame 32, which enables the air cart 12 to be towed with the agricultural implement 10. Further, the fill hopper 38 enables an operator to fill the secondary storage tank 36. Accordingly, the fill hopper 38 is located on a side of the air cart 12 and at a level above the soil 23 that facilitates access by the operator (e.g., from ground level or from a bed of a truck). For example, an opening of the fill hopper 38, which receives the particulate material, may be located less than 5 feet (1.5 meters) above the ground. At this height, the operator may load the fill hopper 38 from ground level or from a truck bed, for example. The secondary storage tank 36 may be loaded by another suitable system in addition to or instead of via the fill hopper, air supply 40, and product conveyance conduits 42. For example, the secondary storage tank 36 may include a door as described below that may be opened by the operator to load the secondary storage tank 36 directly with particulate material.

Additionally, the agricultural system 8 may include a particulate material sensing and agitation control system 37 to control movement of the particulate material within a storage tank. For purposes of discussion, this disclosure primarily refers to the particulate material sensing and agitation control system 37 as being located in the secondary storage tank 36 to control movement of the particulate material in the secondary storage tank 36. However, a particulate material sensing and agitation control system may be located in at least one of the primary storage tanks 26, 28, 30 (e.g., in addition to or instead of the particulate material sensing and agitation control system in the secondary storage tank) to control movement of the particulate material in the primary storage tank(s).

The primary storage tanks 26, 28, and 30, and the secondary storage tank 36 may store the particulate material (e.g., seeds, granular fertilizer, granular inoculants, etc.). In some embodiments, the primary storage tanks 26, 28, and 30 may each include a single large storage compartment for storing a single agricultural product. In certain embodiments, the primary storage tanks may each store a different agricultural product. For example, the first primary storage tank 26 may store legume seeds, and the second primary storage tank 28 may store a dry fertilizer. Additionally, in this example, the secondary storage tank 36 may store granular inoculants, which are planted in conjunction with the legume seeds. In such configurations, the air cart 12 may deliver seed, fertilizer, and inoculant to the agricultural implement 10 via separate primary lines, or as a mixture through a single primary line.

Further, as illustrated, the secondary storage tank 36 is positioned beneath portions of the primary storage tanks 26 and 28. To improve storage capacity of the secondary storage tank 36, upper walls 41 of the secondary storage tank 36 have slopes that substantially correspond to respective slopes of bottom portions 43 of the primary storage tanks 26 and 28. Therefore, the shape of the secondary storage tank 36 enables the secondary storage tank 36 to utilize a substantial portion of the space between the primary storage tanks 26 and 28. Similarly, in an alternative embodiment, the secondary storage tank may be positioned between the primary storage tanks 28 and 30, in front of the primary tank 26, or behind the primary tank 30.

The particulate material may be fed from the secondary storage tank 36 through the particulate material sensing and agitation control system 37 into a metering system 45, which meters the particulate material, fluidizes the particulate material via a fluidizing airflow from the air source 33, and distributes the particulate material to the header 15 via the primary line 25. In some embodiments, the air source 33 may be one or more pumps and/or blowers powered by electric or hydraulic motor(s), for example. The particulate material sensing and agitation control system 37 may be configured to promote movement of the particulate material into the metering system 45 from the secondary storage tank 36. For example, the particulate material sensing and agitation control system 37 may break up clumped sections of particulate material to enable the particulate material to flow to the metering system 45.

Figure 2:
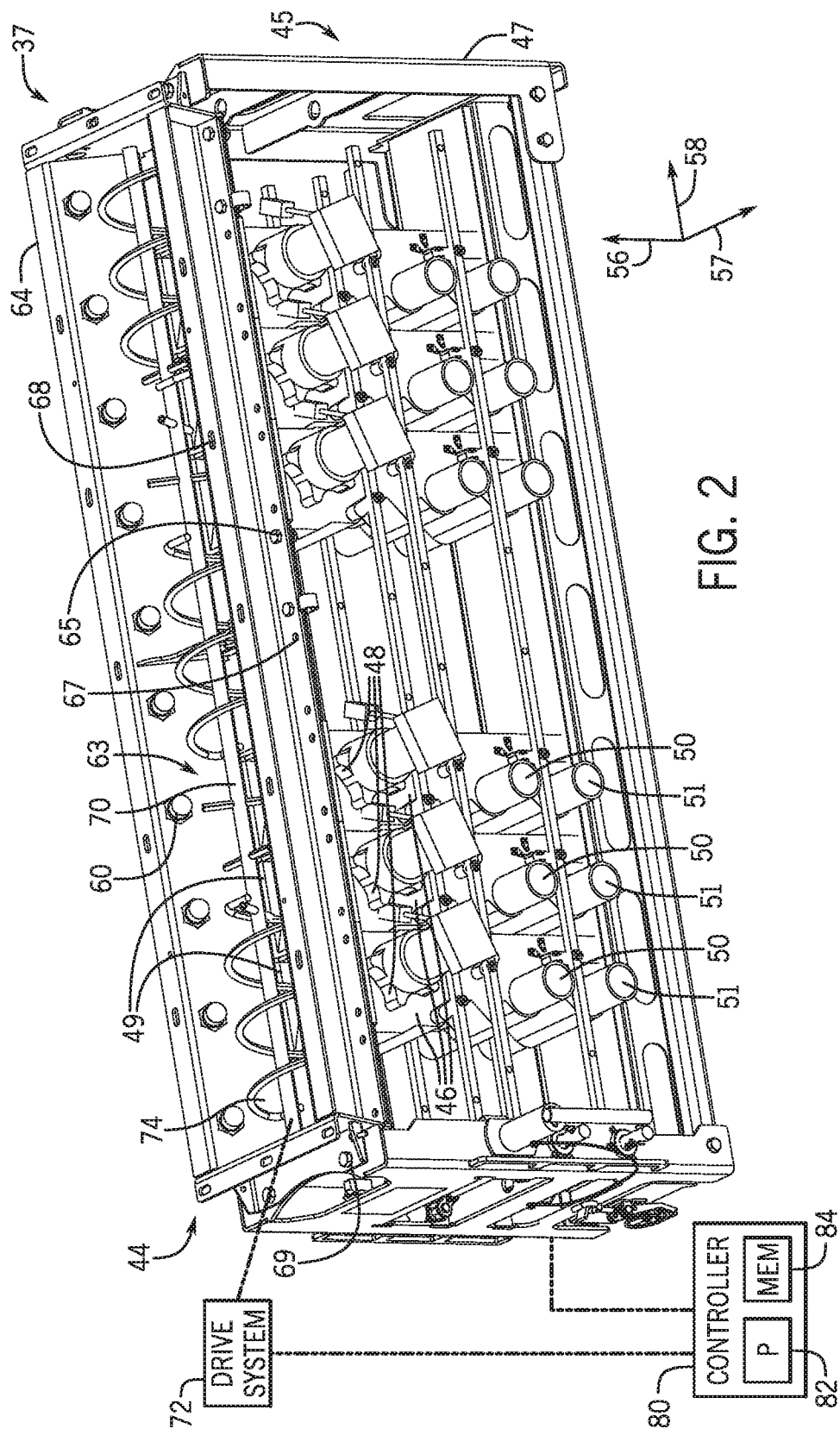
FIG. 2 is a perspective view of an embodiment of a particulate material sensing and agitation control system that may be employed within the air cart of FIG. 1, in accordance with an aspect of the present disclosure.

FIG. 2 is a perspective view of an embodiment of a particulate material sensing and agitation control system 37 that may be employed within the air cart 12 of FIG. 1. The particulate material sensing and agitation control system 37 includes an agitating system 44 positioned above the metering system 45. As illustrated, the metering system 45 includes multiple seed meters 46 supported by a frame 47. The metering system 45 may include 1 to 10, or more than 10 (e.g., 15), seed meters 46. In the illustrated embodiment, each seed meter 46 includes at least one respective metering device 48 (e.g., meter roller) to control flow of particulate material to a respective conduit. Each seed meter 46 also includes an inlet 49 configured to receive the particulate material from the agitating system 44 (e.g., along a vertical axis 56). Furthermore, each seed meter 46 includes a first conduit connector 50 and a second conduit connector 51. Each conduit connector 50, 51 is configured to receive air flow from the air source and the particulate material from the metering device 48, thereby producing the air/material mixture. First primary conduits may be coupled to the first conduit connectors 50 and second primary conduits may be coupled to the second conduit connectors 51. Furthermore, the metering system 45 may include a gate that enables selection of the first conduit connector 50 or the second conduit connector 51. Once the first conduit connector 50 or the second conduit connector 51 is selected, particulate material flows through the selected conduit connector 50, 51. The primary conduits may be coupled to respective headers that provide particulate material to multiple row units.

The illustrated embodiment includes a sub-hopper 64, which may be considered a part of the secondary storage tank. The sub-hopper 64 is secured to the metering system 45 (e.g., the frame 47 of the metering system 45) by fasteners 65 disposed through holes 67, 69 of the sub-hopper 64. The first holes 67 are generally aligned along a length of the sub-hopper 64 along a longitudinal axis 58, and the second holes 69 are arranged along a width of the sub-hopper 64 along a lateral axis 57. The sub-hopper 64 also includes third holes 68 configured to receive fasteners for securing the sub-hopper 64 to a structure of the secondary storage tank or another portion of the agricultural system (e.g., the air cart). Additionally or alternatively, the sub-hopper may be coupled to the frame and the secondary storage tank by other suitable devices, such as welds, tabs, and the like.

Generally, the particulate material may flow downwardly through the secondary storage tank 36 to the metering system 45 via the agitating system 44. That is, the particulate material may flow through the sub-hopper 64 into the inlets 49 of the seed meters 46. In some embodiments, the particulate material may pass through other features of the agricultural system (e.g., of the air cart) before entering the metering system 45.

In the illustrated embodiment, the agitating system 44 includes sensors 60. As illustrated, three sensors 60 are placed along a wall of the sub-hopper 64 (e.g., along the longitudinal axis 58). However, more or fewer sensors may be employed in alternative embodiments. For example, certain embodiments may include 1, 2, 4, 6, 8, 10, 12, 14, or more sensors. Each of the sensors 60 is configured to detect a presence of particulate material at the location or position of the respective sensor. As such, the sensors 60 may determine a profile of particulate material disposed in the sub-hopper 64 and/or the secondary storage tank 36 before, during, and/or after operation of the agricultural system 8. A variety of sensor(s), such as ultrasonic sensor(s), electrostatic sensor(s), inductive sensor(s), capacitive sensor(s), Light Detection and Ranging (LIDAR) sensor(s), and/or other suitable sensor(s) may be used alone or in combination with one another to determine the profile of the particulate material. The sensor(s) may also include one or more cameras disposed in the sub-hopper 64 and/or secondary storage tank 36, in which the camera(s) may be configured to detect the profile. Additionally or alternatively, one or more sensor(s) may be disposed higher in the particulate material sensing and agitation control system or above the particulate material sensing and agitation control system (e.g., along the vertical axis 56). As illustrated in FIG. 2, the sensors 60 are aligned in a row above the agitating system 44. However, the sensors may be disposed in other suitable configurations/arrangements in the particulate material sensing and agitation control system and/or secondary storage tank.

An agitator 63 of the agitating system 44 is disposed within the sub-hopper 64 and extends along the longitudinal axis 58 in an area below the sensors 60 along the vertical axis 56. In certain embodiments, the agitating system may be mounted higher in the secondary storage tank relative to the sub-hopper. For example, the agitating system may be disposed above the sub-hopper, such as within the structure of the secondary storage tank. As the particulate material rests in the secondary storage tank, the particulate material may clump together to form pieces that are larger than desired (e.g., larger than the openings of the inlets 49). When the particulate material flows through the agitating system 44 (e.g., while the agitating system 37 is operating), the clumps of particulate material break into smaller pieces more suitable for flowing through the metering system 45.

The agitator 63 includes a shaft 70 coupled to a drive system 72, and the agitator 63 includes an agitator coil 74 coupled to the shaft 70. In the illustrated embodiment, the agitator coil 74 is wrapped around the shaft 70 and is configured to enable the particulate material to flow between the shaft 70 and the agitator coil 74. Although this disclosure primarily discusses the agitator coil 74 as wrapped in a helical form, in additional or alternative embodiments, the agitator coil may be wrapped in a cylindrical form, a conical form, another suitable form, or any combination thereof, around the shaft. Additionally or alternatively, the agitator may include fingers or protrusions that extend from the shaft, in which movement of the fingers or protrusions induce movement of the particulate material. The agitator may include a certain configuration of fingers or protrusions, such as a concentration (e.g., a number per unit length) of fingers or protrusions, a length of each finger or protrusion, a shape of each finger or protrusion, a position of the fingers or protrusions, and so forth, that may vary along the length of the shaft. Furthermore, there may be more than one agitator coil coupled to the shaft at different locations along the length of the shaft. In the illustrated embodiment, the agitator 63 may rotate to move particulate material in the sub-hopper 64 and/or the secondary storage tank. The agitator 63 may be configured to rotate in either direction to move the particulate material toward each longitudinal side of the sub-hopper 64. In embodiments of the agitating system having more than one agitator, multiple drives may be coupled to the respective agitators (e.g., the shafts) to enable movement of each agitator to be independently controllable. In certain embodiments, other types of agitators may be used in the agitating system. For example, an agitator may move linearly in the sub-hopper (e.g., along the longitudinal axis 58), or may oscillate in the secondary storage tank or in one of the primary storage tanks, to move the particulate material. Such agitators may also be driven via the drive system of this disclosure.

The drive system 72 of the particulate material sensing and agitation control system 37 may be configured to drive the agitator 63 to rotate, such as via a motor (e.g., an electric motor, hydraulic motor, etc.). In the illustrated embodiment, the drive system 72 includes a single motor disposed at an end of the sub-hopper 64. However, additional or alternative embodiments of the drive system may include more than one motor (e.g., 2, 3, 4, 5, etc.). For example, the drive system may include a motor disposed at each longitudinal end of the sub-hopper (e.g., along the longitudinal axis 58). The drive system may also include motor(s) disposed along the length of the sub-hopper. Motor(s) disposed along the length of the sub-hopper may be connected to the agitator(s) and may be configured to drive the agitator(s). As the agitator 63 turns, the agitator 63 drives the particulate material to move within the sub-hopper 64. In further embodiments, a single motor may be configured to drive a particular portion (e.g., a particular length) of the agitator independently from one another, and/or per-meter agitators may be driven by existing meter motors for each section.

In the illustrated embodiment, the agitating system 44 includes a single agitator 63. In certain embodiments, multiple agitators (e.g., 2, 3, 4, 5, 6, 7, 8, etc.) may be disposed in the sub-hopper and/or the secondary storage tank. The agitators may be disposed in series or in parallel. In a configuration with more than one agitator, drive system(s) may drive only a portion of the agitators or all of the agitators to move the particulate material in one or more directions. Multiple agitators may also be disposed at different levels in the sub-hopper and/or secondary storage tank. For example, one or more agitator(s) may be disposed in the sub-hopper and one or more agitator(s) may be disposed higher in the secondary storage tank.

In some embodiments, the particulate material sensing and agitation control system 37 includes a controller 80 that is communicatively coupled to the particulate material sensing and agitation control system 37. The controller 80 may control operation of the particulate material sensing and agitation control system 37, such as rotation of the agitator 63 by controlling the drive system 72. The controller 80 includes a processor 82 configured to execute software code or instructions stored on a memory 84. Moreover, the controller 80 is communicatively coupled to the sensors 60 and the drive system 72 to enable operation of the drive system 72 based on feedback from the sensors 60. The controller 80 may include a processor 82 configured to execute software code or instructions stored on a memory 84. The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

As an example, the memory 84 may store processor-executable software code or instructions (e.g., firmware or software), which are tangibly stored on a tangible computer readable medium. Additionally or alternatively, the memory 84 may store data (e.g., information regarding operation of the particulate material sensing and agitation control system 37). As an example, the memory 84 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 82 may include multiple microprocessors, one or more "general-purpose" microprocessors, one or more special-purpose microprocessors, and/or one or more application specific integrated circuits (ASICS), or some combination thereof. For example, the processor 82 may include one or more reduced instruction set (RISC) or complex instruction set (CISC) processors. The processor 82 and/or memory 84, and/or an additional processor and/or memory, may be located in any suitable portion of the agricultural system. For instance, a memory may be located in the drive system 72.

FIG. 3 is a schematic view of the particulate material sensing and agitation control system 37 having a controller 80. In certain embodiments, the controller 80 includes a user interface 102. The controller 80 may output signal(s) to the user interface 102 indicative of operation of the particulate material sensing and agitation control system 37. In the illustrated embodiment, the user interface 102 includes a display 104, which may present visual information to an operator, such as a graph depicting operation of the particulate material sensing and agitation control system 37. Based on this display of information, the operator may manually operate the agitating system 44. For example, in the illustrated embodiment, the user interface 102 includes a user interaction device 106, such as a touch screen, a button, a keyboard, a microphone, a mousing device, a trackpad, and the like, to enable user input. The user input may be associated with adjusting operation of the agricultural system, such as operation of the particulate material sensing and agitation control system 37.

In some embodiments, the controller 80 includes a power source 108 configured to supply electrical power to the drive system 72. For example, the power source 108 may include a battery, a generator, or another suitable device configured to supply electrical power to the drive system 72, or a combination thereof. The controller 80 may be communicatively coupled to the power source 108 to control the drive system 72. In an alternative embodiment, the controller 80 may be communicatively coupled to the drive system 72 and may directly controller the drive system 72. Additionally, although FIG. 3 illustrates the particulate material sensing and agitation control system 37 as having a single drive system 72, in alternative embodiments, the particulate material sensing and agitation control system may have any suitable number of drive systems, such as two, three, or more than three drive systems. Each drive system 72 may use the supplied electrical power to drive and operate the agitator 63.

In certain implementations, the controller 80 includes a sensing system 110, which may be a part of or communicatively coupled to the controller 80. The sensing system 110 may determine an operating parameter of the drive system 72, such as an operating parameter associated with the power supplied by the power source 108. Based on the determined operating parameter, the controller 80 may be configured to output a signal to adjust an operation of the drive system 72. As described herein, the sensing system 110 is configured to determine a current running through the drive system 72, as provided by the power source 108. In an example embodiment, the controller 80 may receive a current value as determined by the sensing system 110, compare the determined current value with one or more current value thresholds, and instruct the drive system 72 to operate based on the comparison. By way of example, the controller 80 may adjust an amount of power supplied by the power source 108 to the drive system 72, adjust a time at which the drive system 72 is activated, or adjust an operation of another component of the drive system 72.

Figure 4:
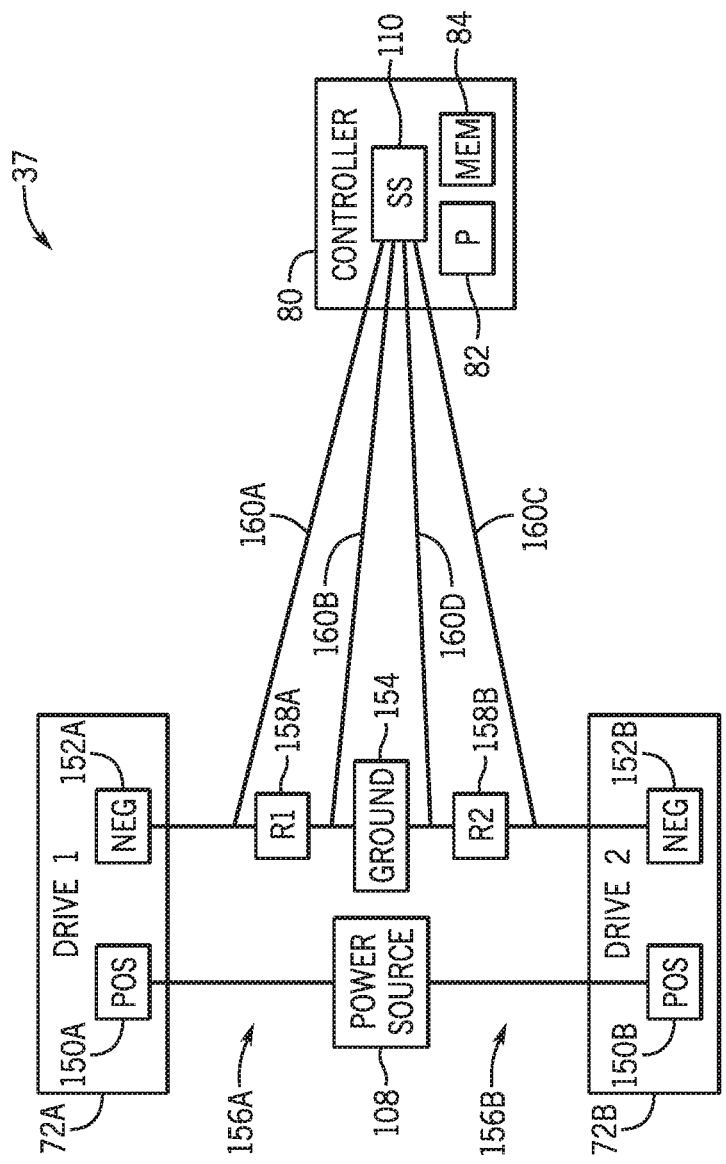
FIG. 4 is a schematic view of the particulate material sensing and agitation control system of FIG. 3 having the controller, in which a sensing system is configured to determine a current flowing through a negative section of a drive system, in accordance with an aspect of the present disclosure.

FIG. 4 is a schematic view of the particulate material sensing and agitation control system 37 of FIG. 3 having the controller 80, in which the sensing system 110 is configured to determine a current flowing through a negative section of a drive system. The controller 80 includes a first drive system 72A and a second drive system 72B. The first drive system 72A includes a first positive lead 150A, and the second drive system 72B includes a second positive lead 150B, in which the first and second positive leads 150 are each electrically coupled to the power source 108. Although the first and second positive leads 150 are each electrically coupled to the same power source 108 in the illustrated embodiment, in additional or alternative embodiments, the positive leads may be electrically coupled to different power sources. In addition, the first drive system 72A includes a first negative lead 152A, and the second drive system 72B includes a second negative lead 152B, and each negative lead 152 is electrically coupled to a common ground 154. A first electrical circuit 156A may be formed by the electrical connections between the power source 108, the first positive lead 150A, the first negative lead 152A, and the ground 154. Likewise, a second electrical circuit 156B may be formed by the electrical connections between the power source 108, the second positive lead 150B, the second negative lead 152B, and the ground 154. The electrical circuits 156 may enable the power source 108 to provide electrical power to the respective drive systems 72. Although two drive systems 72 are included in the illustrated embodiment, there may be any suitable number of drive systems 72 employed by the particulate material sensing and agitation control system 37.

In the illustrated embodiment, the sensing system 110 may be configured to determine an amount of current running through each of the drive systems 72. Generally, a value of current running between two points in an electrical circuit may be represented by the following Equation 1:

$$I = V/R \qquad \text{Equation 1}$$

in which I is current in amperes (A) running between the two points, V is the voltage differential between the two points in volts (V), and R is the resistance of the electrical circuit spanning the two points measured in ohms (Ω). The voltage may be determined based on the power supplied by the power source as measured by the sensing system 110. To enable the sensing system 110 to determine current using Equation 1, each electrical circuit 156 may include a respective resistance component 158 having a known resistance value, in which the resistance components 158 are separate from the sensing system 110.

In some embodiments, each resistance component 158 may be electrically disposed on a section of the respective electrical circuit 156 between the negative lead 152 and the ground 154, which may be considered the negative section of the electrical circuit 156. That is, a first resistance component 158A having a known first resistance value may be positioned in the first electrical circuit 156A adjacent to the ground 154, and a second resistance component 158B having a known second resistance value may be positioned in the second electrical circuit 156B adjacent to the ground 154. To determine the respective voltage across each resistance component 158, the sensing system 110 may measure the voltage differential across the resistance component 158 via inputs 160. In an example embodiment, the inputs 160 monitor the voltage differential between respective points located on opposite sides of each resistance component 158. Using the determined voltage differential and the known resistance value of each resistance component 158, the current running through the resistance component 158 may be calculated via Equation 1. The controller 80 may equate the current running through the resistance component 158 as the current flowing through the respective electrical circuit 156. In certain embodiments, the resistance components 158 may be power resistors that may withstand a power rating of 10 watts and a voltage rating of 5 V–50 V (e.g., 35 V), and may have a resistance of around 0.1Ω. In addition to or as an alternative to a power resistor, the resistance component may be a low resistance wire, a wire harness resistance, or both to determine a voltage differential.

To determine a more accurate current value, the monitored points may be located proximate to the particular resistance component 158. Thus, the resistance value between the monitored points is primarily based on the resistance value of the resistance component 158, rather than other factors, such as resistance from the wiring of the respective electrical circuit 156, or other components of the electrical circuit 156. As such, the known resistance value of the resistance component 158 accurately represents the resistance of the electrical circuit 156 between the monitored points. As a result, a more accurate value of current flow is determined using Equation 1 due to the accurate knowledge of the known resistance value. For example, a first input 160A may monitor a point between the first negative lead 152A and the first resistance component 158A, and a second input 160B may monitor a point between the first resistance component 158A and the ground 154 such that the first resistance component 158A is located between the first input 160A and the second input 160B. Thus, the sensing system 110 may accurately determine the voltage differential across the first resistance component 158A via the detected voltage differential between the first input 160A and the second input 160B. Using the detected voltage differential and the known resistance value of the first resistance component 158A, the sensing system 110 may determine the current flowing through the first resistance component 158A. Similarly, a third input 160C may monitor a point between the second negative lead 152B and the second resistance component 158B, and a fourth input 160D may monitor a point between the second resistance component 158B and the ground 154. The sensing system 110 may accurately then determine the voltage differential across the second resistance component 158B via the detected voltage differential between the third input 160C and the fourth input 160D, and the sensing system 110 may determine the current flowing through the second resistance component 158B via Equation 1, using the determined voltage differential and the known resistance value of the second resistance component 158B. The current determined by the sensing system 110 across each resistance component 158 may be the current flowing through the respective drive systems 72.

Although two drive systems 72 are included in the illustrated embodiment, the controller 80 may be configured to monitor current running through any number of drive systems 72. For example, for each additional drive system, an additional resistance component may be located between the negative lead and the ground. The sensing system may include additional inputs configured to monitor the voltage across the additional resistance component. In certain embodiments, the ground may be used as a single reference to monitor voltage differential in each of the drive systems. In other words, the sensing system may be configured to determine the voltage differential across each resistance component by monitoring a point located between the respective resistance component and the respective negative terminal of each drive system and monitoring the ground. Thus, the sensing system may have one input for monitoring ground, and an additional input for each drive system to monitor a point on the respective drive systems. In additional or alternative embodiments, the sensing system may not include an input to monitor ground. Instead, the controller may have its own control circuit (e.g., to power the controller) that is connected to ground. In such implementations, the controller may reference the ground coupled to the control circuit to determine the voltage differential across each resistance component. Thus, the sensing system may monitor a single point between the respective resistance components and negative terminals of each drive system and monitor the ground of the controller.

FIG. 5 is a schematic view of the particulate material and agitation control system 37 of FIG. 3 having the controller 80, in which the sensing system 110 is configured to determine a current flowing through a positive section of the drive system 72. In the illustrated embodiment, each respective resistance component 158 is electrically disposed at a section of the respective electrical circuit 156 between the respective positive lead 150 and the power source 108, which may be considered the positive section of the electrical circuit 156.

The sensing system 110 of the controller 80 includes inputs 160 configured to detect the voltage differential across each resistance component 158. In certain embodiments, the first input 160A of the sensing system 110 monitors a point between the first positive lead 150A and the first resistance component 158A, and the second input 160B of the sensing system 110 monitors a point between the power source 108 and the first resistance component 158A. Thus, the sensing system 110 may determine a voltage differential across the first resistance component 158A based on the voltage differential between the first input 160A and the second input 160B. As such, the controller 80 may determine the current flowing through the first resistance component 158A, using the determined voltage differential and the known resistance value of the first resistance component 158A, which may be approximately equal to the current flowing through the first drive system 72A, via Equation 1.

Additionally, the sensing system 110 includes the third input 160C that monitors a point between the power source 108 and the second resistance component 158B, and the sensing system 110 includes a fourth input 160D that monitors a point between the power source 108 and the second positive lead 150B. The sensing system 110 may then determine a voltage differential across the second resistance component 158B based on the voltage differential monitored between the third input 160C and the fourth input 160D to enable the controller 80 to determine the current flowing through the second resistance component 158B and the second drive system 72B via Equation 1, using the determined voltage differential and the known resistance value of the second resistance component 158B.

FIG. 6 is a flowchart of an embodiment of a method 200 to determine a condition of a drive system based on a determined current flowing through the drive system. Generally, the amount of current flowing through the drive system is indicative of an amount of torque applied by the drive system. For example, the power source may be configured to provide a substantially constant voltage to the drive system and enable the drive system to apply a torque. As the torque applied to the drive system increases the drive will draw more current from the power source. The increased current flow and increased torque output of the drive system may overcome resistance to rotation (e.g., caused by the particulate material) at the agitator driven by the drive system. Therefore, the greater the resistance of rotation at the agitator, the greater the current flow supplied to the drive system. In certain embodiments, the method 200 may be performed by a controller, such as the controller 80. Additionally, the method 200 is not exclusive, as additional steps may be performed, or certain steps of the method 200 may be modified, removed, and/or performed in a different order.

At block 202, the sensing system determines the current flowing through the drive system. In some embodiments, the sensing system determines the current flow via resistance components disposed on the electrical circuit of the drive system as described above, in which the voltage differential between two points of the electrical circuit is determined, and a known resistance value between the two points is used in order to determine the current flow via Equation 1. At block 204, the controller determines if there is a measurable amount of current (e.g., the current is measurably above zero). For example, the controller may determine whether the voltage drop across the two points is significant enough to determine the current flow via Equation 1. If the current is not measurable, the controller may determine the drive system is not running, as represented by block 206. For example, the drive system may not be receiving power from the power source, such as when the electrical circuit is not powered (e.g., due to deactivation of the drive system, a blown fuse, etc.).

If the current is measurable, the controller determines whether the current is within a range of values, as indicated at block 208. For example, the range of values may include a high threshold and a low threshold, in which the controller compares the determined current with the high threshold and the low threshold. The range of values may be selected or set based on expected current values that may flow through the drive system when moving a certain volume or weight of particulate material. For example, the range of values may be based on a parameter of the drive system, a parameter (e.g., density) of the particulate material, dimensions of the sub-hopper and/or storage tank, and so forth. At block 210, if the controller determines the current is within the range of values (i.e., between the high threshold and the low threshold), the controller may determine that the drive system is running at normal operations. As such, the controller may determine that the drive system is moving the agitator to effectively induce movement of particulate material through the sub-hopper and/or the storage tank.

However, if the controller determines that the current is not within the range of values, the controller may further determine whether the current is below the range of values, as depicted at block 212. That is, the controller may determine if the current is below the low threshold. If the controller determines the current is below the range of values, the controller may determine that the drive system is running with low or no load (block 214). In other words, the agitator operated by the drive system may not be moving particulate material, or may be moving a low amount of material. By way of example, if the level of particulate material is below the agitator, the controller may disable or suspend operation of the agitator to reduce energy consumption and/or inform the operator that the level of particulate material is low.

If the controller determines that the current is not below the range of values (i.e., the determined current is above the high threshold), the controller determines whether the current is above a higher threshold value, as represented by block 216. At block 218, if the controller determines the current is above the higher threshold value, the controller may determine that the drive system is stalled. That is, the controller may determine that the drive system is receiving a high amount of power, but the drive system is not successfully moving the agitator. For example, the particulate material or other debris may be wedged into the sub-hopper to block movement of the agitator, and the controller may disable or suspend operation of the drive system to reduce energy consumption, increase a longevity of the drive system or another component of the particulate material and agitation control system, and/or inform the operator that the drive system is receiving a high amount of power when the controller determines the drive system is stalled. As such, the higher threshold value may be representative of a current value limit of the drive system. To this end, the higher threshold value may be selected or set based on a specification of the drive system, and may be different for each drive system.

At block 220, if the controller does not determine the current is above the higher threshold value, the controller may determine that the drive system is overloaded. In other words, the controller may determine the power source is supplying an amount of power that is higher than desired to move the agitator. As an example, the particulate material may have a significant amount of clumps, which may establish significant resistance to movement of the agitator. In certain embodiments, the controller may determine how much the drive system is overloaded. That is, the controller may compare the determined current with the high threshold to determine the percentage above the range of values at which the drive system is operating, and may instruct the drive system to adjust an activation time of the agitator and/or a direction of activation of the agitator to break up clumps, disable or suspend operation of the drive system, and/or inform the operator that the drive system is overloaded.

In certain embodiments, the controller may determine a profile of the particulate material in the sub-hopper and/or the secondary storage tank based on the respective conditions of the drive systems. For instance, if the controller determines that one drive system is operating with low or no load (e.g., not moving any particulate material) and another drive system is operating normally, the controller may determine that a certain section has more particulate material than another section. In response, the controller may operate the drive systems accordingly to distribute the particulate material substantially evenly across the meters.

In further embodiments, the controller may use the determined current value to determine other operating parameters. By way of example, the controller may use the determined current to calculate a torque output of the drive system and/or a temperature of the drive system. In certain implementations, the controller may further determine a rotational speed (e.g., in rotations per minute [RPM]) of the drive system. For example, the rotational speed may be determined via a lookup table and/or an algorithm relating current and voltage to a corresponding rotational speed, or analyzing characteristics of the current (e.g., determining a time between peaks of current for oscillating agitators). The controller may also save or store the determined current of the drive system over a period of time to determine a pattern of operation of the drive system. In one example, the controller may determine structural longevity of the drive system based on a history of the determined current of the drive system. Using the other operating parameters, the controller may determine an appropriate operation of each drive system, and may operate the drive systems accordingly.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A particulate material sensing and agitation control system of an agricultural system, comprising:
    an agitator configured to induce movement of particulate material through the agricultural system;
    a drive system coupled to the agitator and comprising a negative lead, wherein the drive system is configured to move the agitator, and the drive system is powered via an electrical circuit;
    a sensing system configured to determine a current flowing through the drive system, wherein the sensing system comprises a first input coupled to a first point on the electrical circuit, the sensing system comprises a second input coupled to a second point on the electrical circuit, the sensing system is configured to determine a voltage differential between the first point and the second point, and the sensing system is configured to determine current flowing through the electrical circuit based on the voltage differential; and
    a resistance component electrically disposed between the negative lead and a ground, wherein the resistance component has a known resistance value,
    wherein the sensing system is configured to determine the current flowing through the electrical circuit by dividing the voltage differential with the known resistance value.

2. The particulate material sensing and agitation control system of claim 1, wherein the first point is located between the resistance component and the negative lead, and the second point is located between the resistance component and the ground.

3. The particulate material sensing and agitation control system of claim 2, comprising:
    an additional agitator configured to induce movement of particulate material through the agricultural system;
    an additional drive system coupled to the additional agitator, wherein the additional drive system is configured to move the additional agitator, the additional drive system is powered by an additional electrical circuit, and the additional drive system comprises an additional negative lead; and
    an additional resistance component electrically disposed between the additional negative lead and the ground; and
    wherein the sensing system comprises a third input coupled to a third point on the additional electrical circuit between the additional resistance component and the additional negative lead, the sensing system comprises a fourth input coupled to a fourth point on the additional electrical circuit between the additional resistance component and the ground, the sensing system is configured to determine an additional voltage differential between the third point and the fourth point, and the sensing system is configured to determine current flowing through the additional electrical circuit based on the additional voltage differential.

4. The particulate material sensing and agitation control system of claim 1, wherein the resistance component is a resistor, a resistance wire, a wire harness, or any combination thereof.

5. An agricultural system, comprising:
    an agitator configured to induce movement of particulate material from a storage tank of the agricultural system to a metering system;
    a drive system coupled to the agitator, wherein the drive system is configured to move the agitator, and the drive system is powered via an electrical circuit;
    a sensing system configured to determine a current flowing through the drive system, wherein the sensing system comprises a first input coupled to a first point on the electrical circuit of the drive system, the sensing system comprises a second input coupled to a second point on the electrical circuit of the drive system, the sensing system is configured to determine a voltage differential between the first point and the second point, and the sensing system is configured to determine a determined current value flowing through the first point and the second point based on the voltage differential; and
    a controller communicatively coupled to the sensing system, wherein the controller is configured to:
        operate the drive system based on the determined current value compare the determined current value with a range of current values, and the range of current values comprises a high threshold and a low threshold; and
        determine whether the determined current value is above a higher threshold value in response to determining the determined current value is above the high threshold.

6. The agricultural system of claim 5, wherein the controller is configured to determine whether the determined current value is measurable, the controller is configured to determine the drive system is not operating in response to determining the determined current value is not measurable, and the controller is configured to inform an operator of the agricultural system that the drive system is not operating in response to determining the drive system is not running.

7. The agricultural system of claim 5, wherein the controller is configured to determine the drive system is operating with low or no load in response to determining the determined current value is below the low threshold, and the controller is configured to inform the operator that a level of particulate material is low in response to determining the drive system is running with low or no load.

8. The agricultural system of claim 7, wherein the controller is configured to suspend operation of the drive system in response to determining the drive system is running with low or no load.

9. The agricultural system of claim 5, wherein the controller is configured to determine the drive system is overloaded in response to determining the determined current value is above the high threshold but not above the higher threshold value, and the controller is configured to adjust an activation time of the agitator in response to determining the drive system is overloaded.

10. The agricultural system of claim 5, wherein the controller is configured to determine the drive system is stalled in response to determining the determined current value is above the higher threshold value, and the controller is configured to instruct the drive system to disable or suspend operation of the drive system in response to determining the drive system is stalled.

11. A particulate material sensing and agitation control system of an agricultural system, comprising:
    an agitator configured to induce movement of particulate material through the agricultural system;
    a drive system coupled to the agitator and comprising a positive lead, wherein the drive system is configured to move the agitator;
    a power source configured to supply a current flow to the drive system via an electrical circuit;
    a sensing system configured to determine the current flow, wherein the sensing system comprises a first input coupled to a first point on the electrical circuit, and the sensing system comprises a second input coupled to a second point on the electrical circuit; and
    a resistance component electrically disposed between the positive lead and the power source; and
    wherein the sensing system is configured to determine a voltage differential between the first point and the second point, and the sensing system is configured to determine a determined current value flowing through the first point and the second point based on the voltage differential.

12. The particulate material sensing and agitation control system of claim 11, wherein the first point is located between the resistance component and the power source, and the second point is located between the resistance component and the positive lead.

13. The particulate material sensing and agitation control system of claim 12, comprising:
    an additional agitator configured to induce movement of particulate material through the agricultural system;
    an additional drive system coupled to the additional agitator, wherein the additional drive system is configured to move the additional agitator, and the additional drive system comprises an additional positive lead; and
    an additional resistance component disposed between the power source and the additional positive lead; and
    wherein the power source is configured to supply an additional current flow to the additional drive system via an additional electrical circuit.

14. The particulate material sensing and agitation control system of claim 13, wherein the sensing system comprises a third input coupled to a third point on the additional electrical circuit between the additional resistance component and the power source, the sensing system comprises a fourth input coupled to a fourth point on the additional electrical circuit between the additional resistance component and the additional positive lead, the sensing system is configured to determine an additional voltage differential between the third point and the fourth point, and the sensing system is configured to determine an additional determined current value flowing through the additional electrical circuit based on the additional voltage differential.

* * * * *